(12) United States Patent
Li et al.

(10) Patent No.: US 10,107,594 B1
(45) Date of Patent: Oct. 23, 2018

(54) ANALYSIS METHOD OF ELECTRONIC SPOTTING SCOPE FOR AUTOMATICALLY ANALYZING SHOOTING ACCURACY

(71) Applicant: Huntercraft Limited, Albany, NY (US)

(72) Inventors: Danyang Li, Albany, NY (US); Ming Chen, Albany, NY (US); Yayun Gong, Albany, NY (US)

(73) Assignee: Huntercraft Limited, Albany, NY (US)

( * ) Notice: Subject to any disclaimer, the term of this patent is extended or adjusted under 35 U.S.C. 154(b) by 0 days.

(21) Appl. No.: 15/822,034

(22) Filed: Nov. 24, 2017

(51) Int. Cl.
| | | |
|---|---|---|
| G06K 9/00 | (2006.01) |
| F41G 3/26 | (2006.01) |
| G06T 7/194 | (2017.01) |
| G06T 7/136 | (2017.01) |
| G06T 7/66 | (2017.01) |
| G06T 5/00 | (2006.01) |
| G06T 5/20 | (2006.01) |
| F41G 3/02 | (2006.01) |
| G06T 7/13 | (2017.01) |
| G06T 5/50 | (2006.01) |

(52) U.S. Cl.
CPC .............. *F41G 3/2605* (2013.01); *F41G 3/02* (2013.01); *G06T 5/006* (2013.01); *G06T 5/20* (2013.01); *G06T 5/50* (2013.01); *G06T 7/13* (2017.01); *G06T 7/136* (2017.01); *G06T 7/194* (2017.01); *G06T 7/66* (2017.01); *G06T 2207/20061* (2013.01); *G06T 2207/20192* (2013.01); *G06T 2207/20224* (2013.01)

(58) Field of Classification Search
CPC ....... H04N 5/23212; G06T 7/292; G06T 7/74; G06T 7/70; G06T 2207/20081; G06K 9/627; G06K 2209/21
See application file for complete search history.

(56) References Cited

U.S. PATENT DOCUMENTS

| | | | |
|---|---|---|---|
| 5,775,699 A * | 7/1998 | Orito .......................... F41J 5/10 |
| | | | 273/371 |
| 6,308,084 B1 * | 10/2001 | Lonka ................. H04M 1/0235 |
| | | | 348/14.01 |

* cited by examiner

*Primary Examiner* — Eueng-Nan Yeh
(74) *Attorney, Agent, or Firm* — Novick, Kim & Lee, PLLC; Allen Xue

(57) ABSTRACT

The present invention belongs to the technical field of spotting scopes, particularly to an analysis method for automatically analyzing a shooting accuracy, which is applied to an electronic spotting scope. The analysis method includes the following steps: converting an optical image obtained by a spotting scope into an electronic image, extracting a target paper area from the electronic image, and performing pixel-level subtraction on the target paper area and an electronic reference target paper to detect points of impact, calculating a center point of each of the points of impact, and determining a shooting accuracy according to a deviation of the center point of each of the points of impact and a center point of the target paper area. The analysis method provided by the present invention is simple and intuitive, facilitates the interpretation of a result, and does not need a system with too much artificial intervention to replace an existing monotonous high-error spotting system.

8 Claims, 4 Drawing Sheets

ANALYSIS METHOD OF ELECTRONIC SPOTTING SCOPE FOR AUTOMATICALLY ANALYZING SHOOTING ACCURACY

TECHNICAL FIELD

The present invention mainly belongs to the technical field of spotting scopes, and particularly to an analysis method of an electronic spotting scope for automatically analyzing a shooting accuracy.

BACKGROUND

In a shooting gallery, a shooting location and a target have a certain distance therebetween, and a shooting result may not be directly seen by human eyes after shooting is performed. In order to observe the shooting result, there is a conveyer for conveying a target paper to the shooting location in the prior art, however, such an approach needs the conveyer, so as to be mostly used in an indoor shooting gallery, not in an outdoor shooting gallery; and conveying the target paper needs to consume a certain time. Under this condition, a spotting scope capable of realizing long-range viewing of the shooting result is widely used. The spotting scope performs projection imaging on a target image (target paper) by an optical imaging principle. During using, the target paper may be manually observed by an eyepiece by adjusting a magnification to perform reading to obtain the shooting result.

However, an existing spotting scope has the following shortcomings and inconveniences: (1) because it is a man-made way to judge, reading judgment errors are more or less caused usually due to different viewing angles, and are especially serious when a small image is observed; (2) in a case where the distance is relatively far, a magnification of the spotting scope in the prior art may not be large enough to support large magnification imaging; (3) when readings are repeatedly judged by the eyepiece, the long-term use will make an observer feel eye fatigue; (4) when a target is observed, since the eyepiece has a characteristic of an exit pupil distance, it is difficult to find the target for a green hand, a little eye movement will make a field of view diminish or disappear; (5), after the data is read, it is limited to brain memory or paper records, the brain memory will be forgotten for a long time, the paper records are not conducive to long-term storage and data backtracking, while the paper records can not be timely and conveniently shared among peer enthusiasts, and contents of the records are only boring numbers; and (6) only one person is permitted to observe at the same time, and for a collective entertainment project, the degree of participation of a bystander or a teammate is greatly reduced, and the inconvenience is brought for many people to observe and discuss simultaneously.

SUMMARY

In view of the above-mentioned problems, the present invention provides an integrated multifunctional electronic spotting scope for automatically analyzing a shooting accuracy without manual intervention, and an analysis method thereof from a perspective of a use scenario of the spotting scope in combination with aspects of image science and image processing. The spotting scope of this application is simple and intuitive, easily interprets a result, and does not need a system with too much artificial intervention to replace an existing monotonous high-error spotting system.

The present invention is achieved by the following technical solution.

An analysis method for automatically analyzing a shooting accuracy, which is applied to an electronic spotting scope, the electronic spotting scope performs optical imaging on a target paper and objects around it, the analysis method is characterized by comprising the following steps: converting an optical image obtained by the spotting scope into an electronic image, extracting a target paper area from the electronic image, performing pixel-level subtraction on the target paper area and an electronic reference target paper to detect points of impact, calculating a center point of each of the points of impact, and determining the shooting accuracy according to a deviation between the center point of each of the points of impact and a center point of the target paper area.

Further, wherein performing perspective correction on the target paper area after the target paper area is extracted corrects an outer contour of the target paper area to a circular contour, and point of impact detection is performed by using the target paper area subjected to perspective correction.

Further, wherein extracting a target paper area from the electronic image particularly comprises: performing large-scale mean filtering on the electronic image to eliminate grid interference on the target paper; segmenting the electronic image into a background and a foreground by using an adaptive Otsu threshold segmentation method according to a gray property of the electronic image; and determining a minimum contour by adopting a vector tracing method and a geometric feature of a Freeman link code according to the image segmented into the foreground and background to obtain the target paper area.

Further, wherein performing pixel-level subtraction on the target paper area and an electronic reference target paper to detect points of impact particularly comprises: performing pixel-level subtraction on the target paper area and an electronic reference target paper to obtain a pixel difference image of the target paper area and the electronic reference target paper; wherein a pixel difference threshold of images of a previous frame and a following frame is set in the pixel difference image, and a setting result is 255 when a pixel difference exceeds the threshold, and the setting result is 0 when the pixel difference is lower than the threshold; and the pixel difference image is subjected to contour tracing to obtain a point of impact contour and a center of the contour is calculated to obtain a center point of each of the points of impact.

Further, wherein the perspective correction particularly comprises: obtaining an edge of the target paper area by using a Canny operator, performing maximum elliptical contour fitting on the edge by using Hough transform to obtain a maximum elliptical equation, and performing straight line fitting of cross lines on the edge by using the Hough transform to obtain points of intersection with an uppermost point, a lowermost point, a rightmost point and a leftmost point of the largest elliptical contour, and combining the uppermost point, the lowermost point, the rightmost point and the leftmost point of the largest elliptical contour with four points at the same positions in a perspective transformation template to obtain a perspective transformation matrix by calculation, and performing perspective transformation on the target paper area by using the perspective transformation matrix.

Further, wherein the electronic reference target paper is an electronic image of a blank target paper or a target paper area extracted in historical analysis.

Further, wherein the deviation comprises a longitudinal deviation and a lateral deviation.

Further, wherein the electronic spotting scope comprises an exterior structure, wherein the exterior structure is a detachable structure body as a whole, an internal portion of the exterior structure is an accommodating space with a fixed component, and the accommodating space with the fixed component comprises a field of view unit, electro-optical conversion, a CPU processing unit, a display unit, a power supply and a wireless transmission unit.

Further, wherein the electronic spotting scope has an accuracy analysis module, wherein the accuracy analysis module is configured to analyze a shooting accuracy by adopting the analysis method.

The present invention has advantageous effects that the present invention provides an analysis method for automatically analyzing a shooting accuracy, which may be applied to an electronic spotting scope; and the analysis method may automatically analyze the shooting accuracy according to historical shooting data.

wherein 1. field of view acquisition unit; 2. external leather track; 3. external key; 4. line transmission interface antenna; 5. display unit; 6. tripod interface; 7. battery compartment; 8. electro-optical conversion board; 9. CPU core board; 10. interface board; 11. function operation board; 12. display conversion board; 13. battery pack; 14. rotary encoder; and 15. focusing knob.

DETAILED DESCRIPTION

Objectives, technical solutions and advantages of the present invention will become more apparent from the following detailed description of the present invention when taken in conjunction with accompanying drawings. It should be understood that specific embodiments described herein are merely illustrative of the present invention and are not intended to limit the present invention.

Rather, the present invention encompasses any alternatives, modifications, equivalents, and solutions made within the spirit and scope of the present invention as defined by the claims. Further, in order to give the public a better understanding of the present invention, some specific details are described below in detail in the following detailed description of the present invention. It will be appreciated by those skilled in the art that the present invention may be understood without reference to the details.

Embodiment 1

The present invention provides an electronic spotting scope for automatically analyzing a shooting accuracy. The spotting scope has an accuracy analysis module, wherein the accuracy analysis module analyzes the shooting accuracy by adopting an accuracy analysis method.

Figure 13:
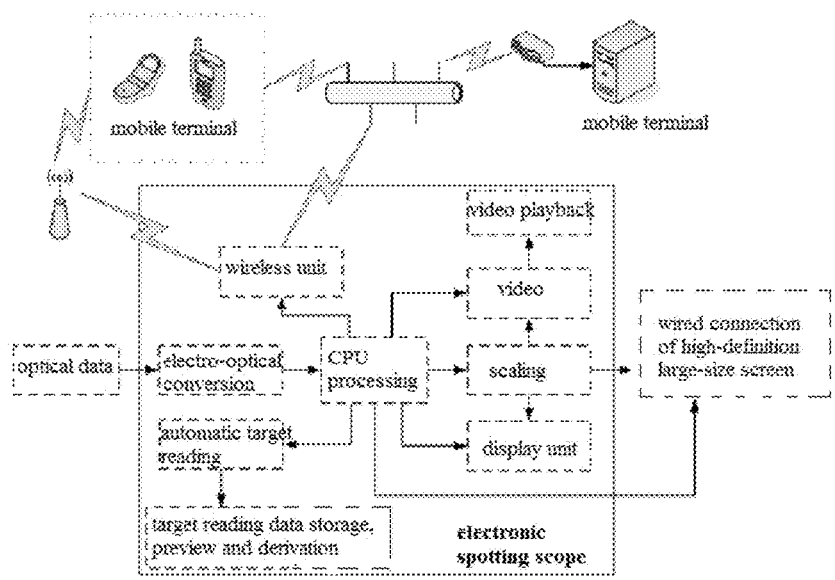
FIG. 13 is a schematic diagram showing functions of an electronic spotting scope in an embodiment 1 according to the present invention.
Figure 14:
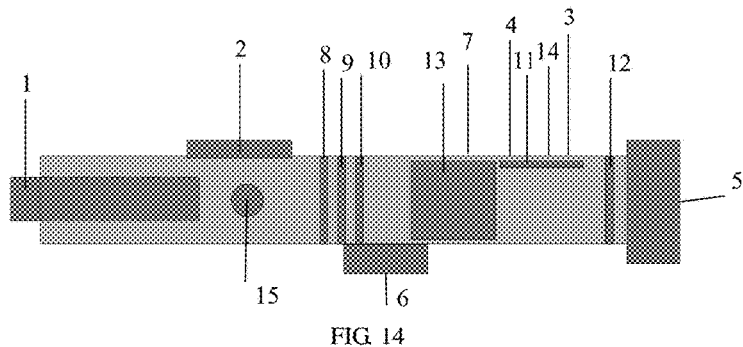
FIG. 14 is a schematic diagram showing a structure of a spotting scope in an embodiment 1 according to the present invention.

Functions of the integrated multifunctional electronic spotting scope system based on automatic analysis of a shooting accuracy of the present invention are shown in FIG. 13, and its structure is shown in FIG. 14.

The spotting scope may be conveniently mounted on a fixed tripod. The spotting scope includes an exterior structure, wherein the exterior structure is a detachable structure body as a whole, an internal portion of the exterior structure is an accommodating space with a fixed component, and the accommodating space with the fixed component includes a field of view unit, electro-optical conversion, a CPU processing unit, a display unit, a power supply and a wireless transmission unit.

The field of view acquisition unit 1 includes an objective lens combination or other optical visual device, and the objective lens combination or the optical visual device is mounted on the front end of the field of view acquisition unit 1 to acquire field of view information.

The spotting scope is a digitallizer as a whole, which may communicate with a smart phone, an intelligent terminal, a sighting apparatus or a circuit and sends video information acquired by the field of view acquisition unit 1 to the smart phone, the intelligent terminal, the sighting apparatus or the circuit, and the information of the field of view acquisition unit 1 is displayed by the smart phone, the intelligent terminal or the like. The field of view information in the field of view acquisition unit 1 is converted by the electro-optical conversion circuit to obtain video information available for electronic display. The circuit includes an electro-optical conversion board 8 which converts a field of view optical signal into an electrical signal, the electro-optical conversion board 8 is located at the rear end in the field of view acquisition unit 1, the electro-optical conversion board 8 converts the optical signal into the electrical signal, while performing automatic exposure, automatic white balance, noise reduction and sharpening operation on the signal, so that the signal quality is improved, and high-quality data is provided for imaging.

The rear end of the electro-optical conversion circuit is connected with a CPU core board 9, and the rear end of the CPU core board 9 is connected with an interface board 10, particularly, the CPU core board 9 is connected with a serial port of the interface board 10 through a serial port, the CPU core board 9 is disposed between the interface board 10 and the electro-optical conversion plate 8, the three components are placed in parallel, and board surfaces are all perpendicular to the field of view acquisition unit 1, and the electro-optical conversion plate 8 transmits the converted video signal to the CPU core board 9 for further processing through a parallel data interface, and the interface board 10 communicates with the CPU core board 9 through a serial port to transmit peripheral operation information such as battery power, time, WIFI signal strength, key operation and knob operation to the CPU core board 9 for further processing.

The CPU core board 9 may be connected with a memory card through the interface board 10. In the embodiment of the present invention, with the field of view acquisition unit 1 as an observation entrance direction, a memory card slot is disposed at the left side of the CPU core board 9, the memory card is inserted in the memory card slot, information may be stored in the memory card, and the memory card may automatically upgrade a software program built in the system.

With the field of view acquisition unit 1 as the observation entrance direction, a USB interface is disposed on a side of the memory card slot on the left side of the CPU core board 9, and by means of the USB interface, the system may be powered by an external power supply or information of the CPU core board 9 is output.

With the field of view acquisition unit 1 as the observation entrance direction, an HDMI interface is disposed on a side of the USB interface at the side of the memory card slot on the left side of the CPU core board 9, and real-time video information may be transmitted to a high-definition display device of the HDMI interface through the HDMI interface for display.

A housing is internally provided with a battery compartment 7, a battery pack 13 is disposed within the battery compartment, an elastic sheet is disposed within the battery compartment 7 for fastening the battery pack 13, the battery compartment 7 is disposed in the middle in the housing, and a cover of the battery compartment may be opened by the side of the housing to realize replacement of the battery pack 13.

A line welding contact is disposed at the bottom side of the battery compartment 7, the contact is connected with the elastic sheet inside the battery compartment, the contact of the battery compartment 7 is welded with a wire with a wiring terminal, and is connected with the interface board 10 for powering the interface board 10, the CPU core board 9, the electro-optical conversion board 8, the function operation board 11, the display conversion board 12 and the display unit 5.

The display unit 5 is a display screen, the display unit 5 is connected with the interface board 10 through the display conversion board 12, thereby communicating with the CPU core board 9; the CPU core board transmits display data to the display unit 5 for display. The display unit 5 includes a display screen and a touch screen, wherein the display screen and the touch screen are glued by adopting a pressure sensitive adhesive, the touch screen may directly operate a software interface for setting and selecting a function. The display unit 5 is of a design manner which may be adjusted up and down as well as left and right, and may be adjusted in a suitable position according to different heights, illumination angles and the like to ensure observation comfort and clarity.

The processed information of the electro-optical conversion unit is displayed on the display screen, while information for auxiliary analysis and operation instructions is displayed on the display screen as well.

An external key 3 is disposed at the top of the housing, and connected onto the interface board 10 through the function operation board 11 on the inner side of the housing, and functions of turning the device on or off: photographing and video-recording may be realized by touching and pressing the external key.

A rotary encoder 14 with a key function is disposed on one side, which is close to the external key 3, on the top of the housing, and the rotary encoder 14 is connected with the function operation board 11 inside the housing. The rotary encoder controls functions such as function switching, magnification data adjustment, information setting, operation derivation and transmission.

A wireless transmission interface antenna 4 is disposed at a position, which is close to the rotary encoder 14, on the top of the housing, the interface antenna is connected with the function operation board 11 inside the housing, and the function operation board has a wireless transmission processing circuit which is responsible for transmitting an instruction and data transmitted by the CPU core board as well as receiving instructions transmitted by networking devices such as an external mobile terminal.

With the field of view acquisition unit 1 as the observation entrance direction, a focusing knob 15 is disposed at one side, which is close to the field of view acquisition unit 1, on the right side of the housing, and the focusing knob 15 adjusts focusing of the field of view acquisition unit 1 by a spring mechanism, so as to achieve the purpose of clearly observing an object under different distances and different magnifications.

A tripod interface 6 is disposed at the bottom of the housing for being fixed on the tripod.

An external leather track 2 is disposed at the top of the field of view acquisition unit 1 of the housing, and the external leather track 2 and the field of view acquisition unit 1 are designed with the same optical axis and fastened by screws. The external leather track 2 is designed in a standard size and may be provided with an object fixedly provided with a standard Picatinny connector, and the object includes a laser range finder, a fill light, a laser pen, and the like.

By applying the above spotting scope, an observer does not need to observe by a monocular eyepiece. Front target surface information is displayed directly in a high-definition liquid crystal display of the spotting scope in an image video form through the electro-optical conversion circuit. By means of an optical magnification and electronic magnification combination manner, a distant object is displayed in a magnified manner, and the target surface information may be clearly and completely seen through the screen.

By applying the above spotting scope, without manual data interpretation, through related technologies of image recognition and pattern recognition, old points of impact are automatically filtered, information of newly-added points of impact is reserved, and a specific deviation value and a specific deviation direction of each bullet from a blank at the time of this shooting are automatically calculated; shooting accuracy information may be stored in a database, data in the database may be locally browsed, and shooting within a period of time may be self-evaluated according to data time, the spotting scope system may automatically generate a shooting accuracy trend within a period of time, and provide an intuitive accuracy expression for training in a graph form; and the above text data and the above graph data may be derived locally for being printed so as to be further analyzed and used.

By applying the above spotting scope, the entire process may be completely recorded in a video manner, and the video record may be used as a sharing video between enthusiasts, the video is uploaded to a video sharing platform via Internet, and the video may be locally placed back for a user to play back the entire shooting and accuracy analyzing process.

By applying the above spotting scope, it may be linked with a mobile terminal through the network. A linkage mode includes: with the spotting scope as a hotspot, the mobile device is connected with it; and further includes: the spotting scope and the mobile device are connected to the same wireless network for connection.

By applying the above spotting scope, it is possible to output real-time image data to a high-definition large-size liquid crystal display television or a television wall by wired transmission, so that all people in a certain area can watch on-site at the same time.

The present embodiment further provides an analysis method of an electronic spotting scope for automatically analyzing a shooting accuracy. The analysis method includes the following steps.

(1) Electro-optical conversion, namely, converting an optical image obtained by the spotting scope into an electronic image.

(2) Target paper area extraction, namely, extracting a target paper area from the electronic image.

A target paper area of interest is extracted from a global image, and the interference of complex background environment information is eliminated. The target paper area extraction method is a target detection method based on adaptive threshold segmentation. The detection method is high in speed of determining the threshold, and better in performance for a variety of complex conditions, and guarantees the segmentation quality. The detection method sets t as a segmentation threshold of the foreground and the background by employing an idea of maximizing an interclass variance, wherein a ratio of the number of foreground points to the image is w0, an average gray value is u0; and a ratio of the number of background points to the image is w1, an average gray value is u1, and u is set as the total average gray value of the image, then:

$$u=w0*u0+w1*u1$$

t is traversed from the minimum gray level value to the maximum gray level value, when a value of t lets a value of g to be maximum, t is an optimal segmentation threshold;

$$g=w0*(u0-u)^2+w1*(u1-u)^2.$$

Figure 4:
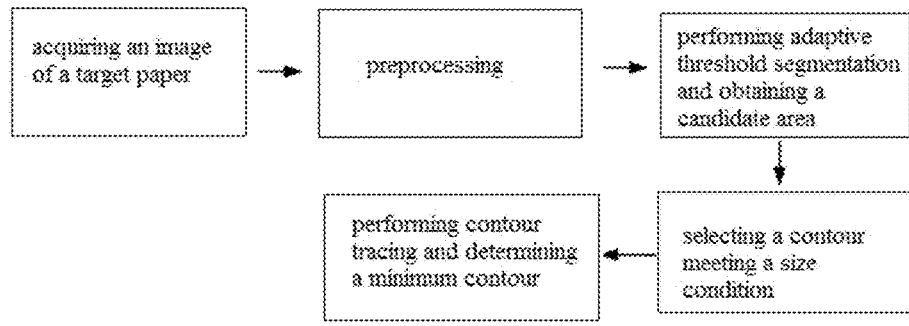
FIG. 4 is a block diagram of a process for extracting a target paper area according to the present invention.

A process for executing the target paper extraction method is as shown in FIG. 4. The target paper extraction method includes four steps, namely, image mean filtering, determination of the segmentation threshold by using an Otsu threshold method, determination of a candidate area by threshold segmentation, determination and truncation of the minimum contour by using a contour tracing algorithm.

(21) Image mean filtering.

The image is subjected to large-scale mean filtering to eliminate grid interference on a target paper, highlighting a circular target paper area. By taking a sample with a size 41*41 as an example, a calculation method is as follows:

$$g(x, y) = \frac{1}{41*41} \sum_{i=-20}^{i=20} \sum_{j=-20}^{j=20} \text{orgin}(x+i, y+j);$$

wherein g(x,y) represents a filtered image, x represents a horizontal coordinate of a center point of a sample on a corresponding point on the image, y represents a longitudinal coordinate of the center point of the sample on the corresponding point on the image, i represents a pixel point horizontal coordinate index value between −20 and 20 relative to x, and j represents a pixel point longitudinal coordinate index value between −20 and 20 relative to y.

(22) Determination of the segmentation threshold by using an Otsu threshold method.

Threshold segmentation segments the image into the background and the foreground by using the adaptive Otsu threshold segmentation (OTSU) method according to a gray property of the image. The greater a variance between the background and the foreground is, the greater the difference between the two parts of the image is. Therefore, for the image I(x, y), the segmentation threshold of the foreground and the background is set as Th, a ratio of pixel points belonging to the foreground to the whole image is w2, and its average gray level is G1; a ratio of pixel points belonging to the background to the whole image is w3, and its average gray level is G2, the total average gray level of the image is G_Ave, an interclass variance is g, a size of the image is M*N, in the image, the number of pixels with gray level values smaller than the threshold is denoted as N1, and the number of pixels with gray level values greater than the threshold is denoted as N2, then $$w2 = \frac{N1}{M*N};$$

$$w3 = \frac{N2}{M*N};$$

$$M*N = N1 + N2;$$

$$w2 + w3 = 1;$$

$$G\_Ave = w2*G1 + w3*G2;$$

$$g=w2*(G\_Ave-G1)^2+w3*(G\_Ave-G2)^2;$$

the resultant equivalence formula is as follows:

$$g=w2*w3*(G1-G2)^2;$$

the segmentation threshold th when the interclass variance g is maximum may be obtained by employing a traversing method.

(23) Segmentation of the filtered image in combination with the determined segmentation threshold th.

$$g(x, y) = \begin{cases} 255, \text{Input}(x, y) \geq Th \\ 0, \text{Input}(x, y) < Th \end{cases};$$

a binary image segmented into the foreground and the background is obtained.

(24) Determination and truncation of the minimum contour by employing a contour tracing algorithm.

Contour tracing employs a vector tracing method of a Freeman chain code, which is a method for describing a curve or boundary by using coordinates of a starting point of the curve and direction codes of boundary points. The method is a coded representation method of a boundary, which uses a direction of the boundary as a coding basis. In order to simplify the description of the boundary, a method for describing a boundary point set is employed.

Figure 1:
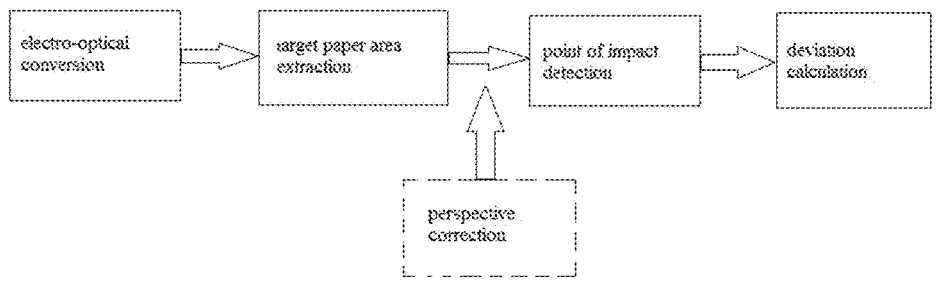
FIG. 1 is a block diagram of a flow of an analysis method according to the present invention.
Figure 2:
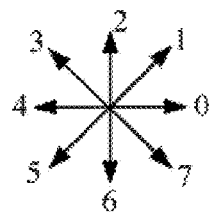
FIG. 2 is a 8-connected chain code in an embodiment 1 according to the present invention.

Commonly used chain codes are divided into a 4-connected chain code and a 8-connected chain code according to the number of adjacent directions of a center pixel point. The 4-connected chain code has four adjacent points, respectively in the upper side, the lower side, the left side and the right side of the center point. The 8-connected chain code increases 4 inclined 45° directions compared with the 4-connected chain code, because there are eight adjacent points around any one pixel, and the 8-connected chain code just coincides with an actual situation of the pixel points, information of the center pixel point and its adjacent points may be accurately described. Accordingly, this algorithm employs the 8-connected chain code, as shown in FIG. 2.

A 8-connected chain code distribution table is as shown in Table 1:

TABLE 1

8-connected chain code distribution table

| 3 | 2 | 1 |
|---|---|---|
| 4 | P | 0 |
| 5 | 6 | 7 |

Figure 3:
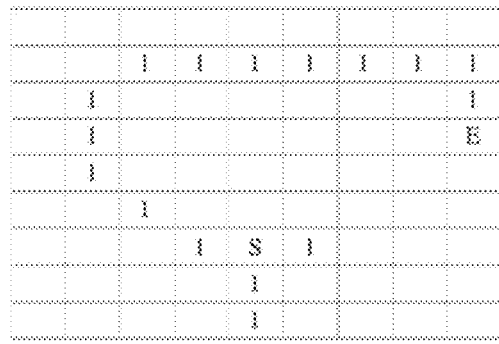
FIG. 3 is a bitmap in an embodiment 1 according to the present invention.

As shown in FIG. 3, a 9×9 bitmap is given, wherein a line segment with a starting point S and an end point E may be represented as L=43322100000066.

A FreemanList structure is customized in combination with a custom structure body:
{
int x;
int y;
int type;
FreemanList* next;
} whether the head and the tail of a chain code structure are consistent or not is determined, so that whether the contour is complete or not is determined.

An image of the target paper area is obtained and then stored.

(3) Detecting points of impact.

The point of impact detection method is a background subtraction-based point of impact detection method. The method includes: detecting points of impact from the image of the target paper area, and determining a position of a center point of each of the points of impact. This method stores the previous target surface pattern, and then uses the current target surface pattern for pixel-level subtraction with the previous target surface pattern. Since images of two frames may have a pixel deviation during the perspective correction calculation of the image, a downsampling method is employed to count an area with 2 pixels as a step length, wherein the area is obtained by calculating the downsampled gray level map with the minimum gray level value as the pixel gray level value within a 2*2 pixel area, with a gray level greater than 0; and this area is subjected to contour detection to obtain information of newly generated points of impact pattern.

The point of impact detection method is high in processing speed when comparison is performed by utilizing pixel-level subtraction of the images of the previous frame and the following frames, and can ensure that positions of the newly generated points of impact are returned.

The point of impact detection method is performed as follows.

(31) Storing an original target paper image

Data of the original target image is stored and read in a cache to enable the original target image to serve as a reference target paper image. If a target subjected to accuracy calculation is shot again during shooting, the target paper area stored at the time of the last accuracy calculation is used as a reference target paper image.

(32) Performing pixel-level subtraction on the image subjected to the processing of the steps (1) to (2) and the original target paper image to obtain a difference position.

The pixel difference threshold of the images of the previous frame and the following frame is set. A setting result is 255 when a pixel difference exceeds the threshold, and the setting result is 0 when the pixel difference is lower than the threshold.

$$result(x, y) = \begin{cases} 255, \text{grayPre}(x, y)\_\text{grayCur}(x, y) \geq threshold \\ 0, \text{grapPre}(x, y)\_\text{grayCur}(x, y) < threshold \end{cases};$$

a specific threshold may be obtained through debugging, with a set range generally between 100 and 160.

(33) Performing contour tracing on the image generated in the step (32) to obtain a point of impact contour and calculating a center point of each of the points of impact.

Contour tracing is performed by a Freeman chain code to calculate an average to obtain the center point of each of the points of impact, and its calculation formula is as follows:

$$Centerx_i = \frac{1}{n} \sum_{i \in FreemanList} FreemanList_i \cdot x;$$

$$Centery_i = \frac{1}{n} \sum_{i \in FreemanList} FreemanList_i \cdot y;$$

$Centerx_i$ represents a center x-axis coordinate of an i-th point of impact, $Centery_i$ represents a center y-axis coordinate of the i-th point of impact, $Freemanlist_i$ represents a contour of the i-th point of impact; and n is a positive integer.

Figure 12:
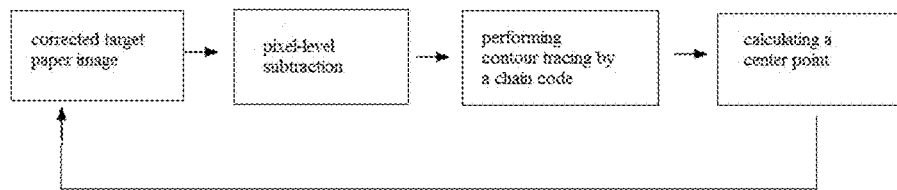
FIG. 12 is a block diagram of a process for performing a point of impact detection method according to the present invention.

A process for performing the point of impact detection method is as shown in FIG. 12.

(4) Calculating a deviation.

A horizontal deviation and a longitudinal deviation between each of the points of impact and a center of the target paper are detected to obtain a deviation set.

Pixel-level subtraction is performed on the target paper area and the electronic reference target paper to detect the points of impact, and the center point of each of the points of impact is calculated, and the shooting accuracy is determined according to the deviation between the center point of each of the points of impact and the center point of the target paper area.

Embodiment 2

This embodiment is substantially the same as the embodiment 1, with a difference lying in including a target paper area correction step after the target paper area is extracted.

Figure 11:
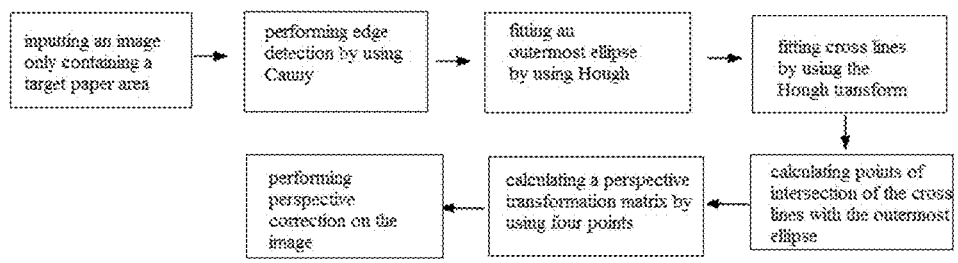
FIG. 11 is a block diagram of a process for performing target paper area correction according to the present invention.

In combination with FIG. 11, the process of target paper area correction is described in detail below.

Due to the pasting of the target paper as well as an angular deviation between the spotting scope and the target paper when the image is acquired, an effective area of the extracted target paper may be tilted so that the acquired image is non-circular. In order to ensure that the calculated deviation value of each of the points of impact is higher in accuracy, perspective correction is performed on the target paper image to correct the outer contour of the target paper into a regularly circular contour. The target paper area correction method is a target paper image correction method based on an elliptical end point, and the method obtains the edge of the image by using a Canny operator. Since the target paper image almost occupies the whole image, maximum elliptical contour fitting is performed by using Hough transform in the case of small parameter change range to obtain the maximum elliptic equation. There are cross lines in the target paper image, and a number of points of intersection with the ellipse, and these points of intersection correspond to the uppermost point, the lowermost point, the rightmost point and the leftmost point of the largest elliptical contour in a standard graph, respectively. Straight line fitting of the cross lines is performed by using Hough transform. In an input sub-image, an intersection point set of the cross lines and the ellipse is obtained, and a perspective transformation matrix is calculated in combination with a point set of the same positions of the template.

The target paper area correction method may quickly obtain an outermost ellipse contour parameter by using the Hough transform. Meanwhile, a Hough transform straight line detection algorithm under polar coordinates can quickly obtain a straight line parameter as well, so that the method can quickly correct the target paper area.

The target paper area correction method is performed as follows.

(51) Performing edge detection by using a Canny operator.

The method includes five parts of conversion of RGB into a gray level map, Gaussian filtering to suppress noise, first-order derivative calculation of a gradient, non-maximum suppression, detection and connection of the edge by a double-threshold method.

Conversion of RGB into a Gray Level Map

Gray level conversion is performed by a conversion ratio of RGB into a gray level to convert a RGB image into a gray level map (three-primary colors of R, G and B are converted to gray level values), and its process is performed as follows:

$$Gray=0.299R+0.587G+0.114B$$

Gaussian Filtering of the Image.

Gaussian filtering is performed on the converted gray level map to suppress noise of the converted image, σ is set as a standard deviation, at this time, a size of the template is set as (3*σ+1)*(3σ+1) according to a Gaussian loss minimization principle, x is set as a horizontal coordinate deviating from the center point of the template, y is set as a longitudinal coordinate deviating from the center point of the template, and K is set as a weight value of a Gaussian filtering template, and its process is performed as follows:

$$K = \frac{1}{2\pi\sigma*\sigma} e^{-\frac{x*x+y*y}{2\sigma*\sigma}};.$$

Calculation of a gradient magnitude and a gradient direction by using a finite difference of first-order partial derivative.

A convolution operator:

$$S_x = \begin{bmatrix} -1 & 1 \\ -1 & 1 \end{bmatrix};$$

$$S_y = \begin{bmatrix} 1 & 1 \\ -1 & -1 \end{bmatrix};$$

the gradient is calculated as follows:

$$P[i,j]=(f[i,j+1]-f[i,j]+f[i+1,j+1]-f[i+1,j])/2;$$

$$Q[i,j]=(f[i,j]-f[i+1,j]+f[i,j+1]-f[i+1,j+1])/2;$$

$$M[i,j]=\sqrt{P[i,j]^2+Q[i,j]^2};$$

$$\theta[i,j]=\tan^{-1}(Q[i,j]/P[i,j]);$$

Non-Maximum Suppression.

The method is to find the local maximum of the pixel point, the gray level value corresponding to a non-maximum point is set to 0, so that most of non-marginal points are eliminated.

Figure 5:
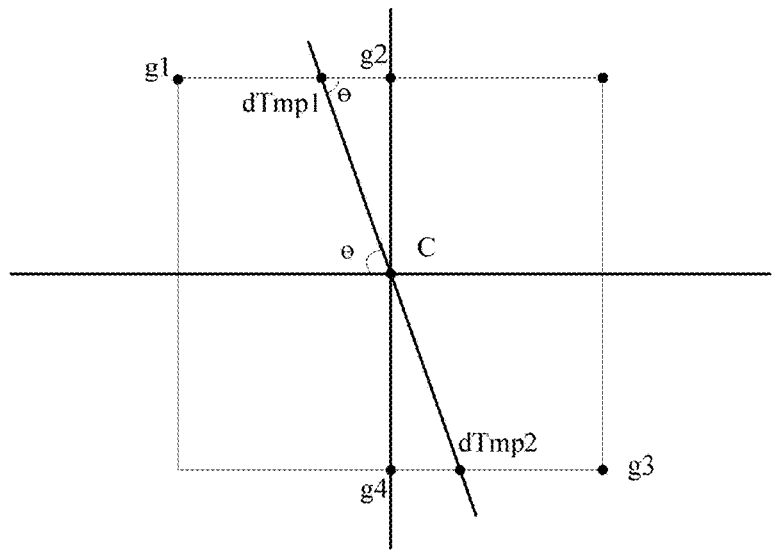
FIG. 5 is a schematic diagram of non-maximum suppression in an embodiment 2 according to the present invention.

It may be known from FIG. 5, it is necessary to determine whether the gray level value of the pixel point C is maximum within its 8-valued neighborhood when non-maximum suppression is performed. In FIG. 5, a direction of a line dTmpIdTmp2 in FIG. 5 is a gradient direction of the point C, in this way, it may be determined that its local maximum value is definitely distributed on this line, that is, in addition to the point C, values of the two points of intersection dtmp1 and dTmp2 in the gradient direction will be local maximums. Therefore, determining the gray level value of the point C and the gray level values of these two points may determine whether the point C is a local maximum gray point within its neighborhood. If the gray level value of the point C is less than any of these two points, then the point C is not the local maximum, and it may be excluded that the point C is an edge.

Detection and Connection of the Edge by Adopting a Double-Threshold Algorithm.

A double-threshold method is used to further reduce the number of non-edges. A low threshold parameter Lthreshold and a high threshold parameter Hthreshold are set, and the two constitute a comparison condition, the high threshold and numerical values above the high threshold are converted into 255 values for storage, numerical values between the low threshold and the high value are uniformly converted into 128 values for storage, and other values are considered as non-edge data and replaced by 0.

$$g(x,y) = \begin{cases} 0, & g(x,y) \leq Lthreshold \\ 255, & g(x,y) \geq Hthreshold \\ 128, & Lthreshold < g(x,y) < Hthreshold \end{cases};$$

edge tracing is performed by utilizing the Freeman chain code again to filter out edge points with small length.

(52) Fitting the cross lines by using the Hough transform under the polar coordinates to obtain a linear equation.

Figure 6:
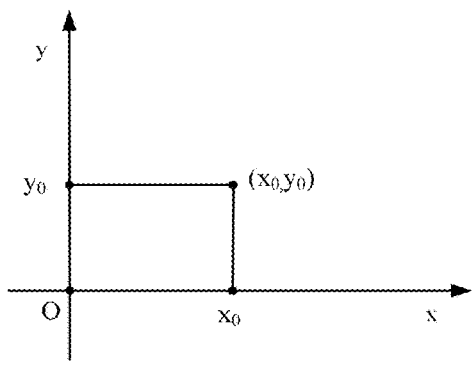
FIG. 6 is a schematic diagram of an original point under a Caresian coordinate system in an embodiment 2 according to the present invention.

The Hough transform is a method for detecting a simple geometric shape of a straight line and a circle in image processing. One straight line may be represented as y=kx+b by using a Caresian coordinate system, then any one point (x,y) on the straight line is converted into a point in a k-b space, in other words, all non-zero pixels on the straight line in an image space are converted into a point in the k-b parameter space. Accordingly, one local peak point in the parameter space may correspond to one straight line in an original image space. FIG. 6 shows the original point $(x_0, y_0)$ in the Caresian coordinate system. Since a slope has an infinite value or an infinitesimal value, the straight line is detected by using a polar coordinate space. In a polar coordinate system, the straight line can be represented as follows:

$$\rho = x^* \cos \theta + y^* \sin \theta$$

Figure 7:
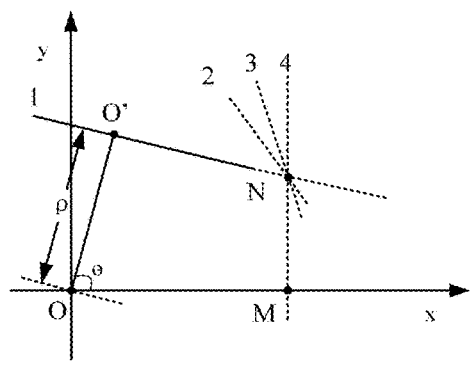
FIG. 7 is a schematic diagram showing any four straight lines passing through the original point under a Caresian coordinate system in an embodiment 2 according to the present invention.
Figure 8:
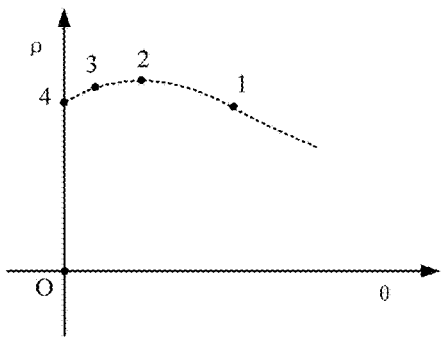
FIG. 8 is a schematic diagram of expression of any four straight lines passing through the original point under a polar coordinate system in a Caresian coordinate system in an embodiment 2 according to the present invention.

It may be known from the above formula in combination with FIG. 7, a parameter $\rho$ represents a distance from an origin of coordinates to the straight line, each set of parameters $\rho$ and $\theta$ will uniquely determine one straight line, and only if the local maximum value serves as a search condition in the parameter space, a straight line parameter set corresponding to the local maximum may be acquired. FIG. 8 shows straight lines 1, 2, 3, and 4 passing through the original point in a polar coordinate system.

After the corresponding straight line parameter set is obtained, the non-maximum suppression is used to reserve a parameter of the maximum.

(53) Calculating four points of intersection of the cross lines with the ellipse.

Figure 9:
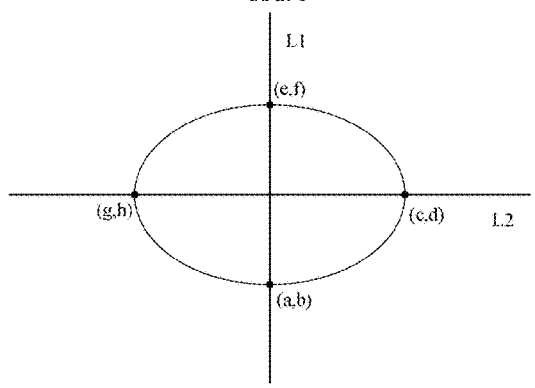
FIG. 9 is a schematic diagram of determining points of intersection of cross lines L1 and L2 with an ellipse in an embodiment 2 according to the present invention.

L1 and L2 linear equations are known, as long as points of intersection with an outer contour of the ellipse are searched in a straight line direction to obtain four intersection point coordinates (a, b), (c, d), (e, f), (g, h), as shown in FIG. 9.

(54) Calculating a perspective transformation matrix parameter for image correction.

The four points of intersection are used to form four point pairs with coordinates of four points defined by the template, and the target paper area is subjected to perspective correction.

Figure 10:
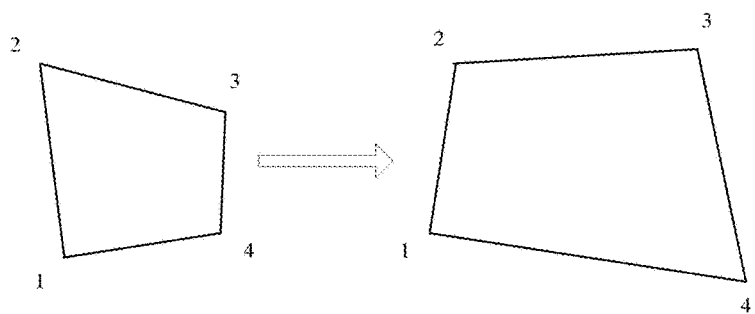
FIG. 10 is a schematic diagram of a perspective transformation diagram in an embodiment 2 according to the present invention.

The perspective transformation is to project the image to a new visual plane, and a general transformation formula is in the following, where $a_{ij}$ are coefficients that forms the perspective transformation matrix:

$$[x', y', w'] = [u, v, w] \begin{bmatrix} a_{11} & a_{12} & a_{13} \\ a_{21} & a_{22} & a_{23} \\ a_{31} & a_{32} & a_{33} \end{bmatrix}$$

u and v are coordinates of an original image, corresponding to coordinates x' and y' of the transformed image. In order to construct a three-dimensional matrix, auxiliary factors w, w' are added, w is taken as 1, and w' is a value of the transformed w, wherein $$x' = x/w;$$

$$y' = y/w;$$

the above formulas may be equivalent to:

$$x' = \frac{x}{w} = \frac{a_{11} * u + a_{21} * v + a_{31}}{a_{13} * u + a_{23} * v + a_{33}};$$

$$y' = \frac{y}{w} = \frac{a_{12} * u + a_{22} * v + a_{32}}{a_{13} * u + a_{23} * v + a_{33}};$$

accordingly, the perspective transformation matrix can be obtained by giving the coordinates of the four points corresponding to the perspective transformation. After the perspective transformation matrix is obtained, the image or the pixel point may be subjected to perspective transformation. As shown in FIG. 10:

in order to facilitate the calculation, we have simplified the above formula, $(a_1, a_2, a_3, a_4, a_5, a_6, a_7, a_8)$ is set as 8 parameters of the perspective transformation, and the above formulas are equivalent to:

$$x' = \frac{a_1 * x + a_2 * y + a_3}{a_7 * x + a_8 * y + 1};$$

$$y' = \frac{a_4 * x + a_5 * y + a_6}{a_7 * x + a_8 * y + 1};$$

wherein (x,y) represents a to-be-calibrated map coordinate, (x',y') represents a calibrated map coordinate, that is, a template map coordinate. The above formulas are equivalent to:

$$a_1*x+a_2*y+a_3-a_7*x*x'-a_8*y*x'-x'=0;$$

$$a_4*x+a_5*x+a_6-a_7*x*y'-a_8*y*y'-y'=0;$$

the above formulas are converted into a matrix form:

$$\begin{bmatrix} x & y & 1 & 0 & 0 & 0 & -xx' & -yx' \\ 0 & 0 & 0 & x & y & 1 & -xy' & -yy' \end{bmatrix} \begin{bmatrix} a_1 \\ a_2 \\ a_3 \\ a_4 \\ a_5 \\ a_6 \\ a_7 \\ a_8 \end{bmatrix} = \begin{bmatrix} x' \\ y' \end{bmatrix};$$

since there are 8 parameters, one point has two equation pairs, so that only 4 points can solve the corresponding 8 parameters. $(x_i, y_i)$ is set as a coordinate of a pixel point of a to-be-calibrated image, $(x'_i, y'_i)$ is set as a coordinate of a pixel point of a template map, i={1, 2, 3, 4}. Accordingly, the matrix form may be converted into:

$$\begin{bmatrix} x_1 & y_1 & 1 & 0 & 0 & 0 & -x_1x'_1 & -y_1x'_1 \\ 0 & 0 & 0 & x_1 & y_1 & 1 & -x_1y'_1 & -y_1y'_1 \\ x_2 & y_2 & 1 & 0 & 0 & 0 & -x_2x'_2 & -y_2x'_2 \\ 0 & 0 & 0 & x_2 & y_2 & 1 & -x_2y'_2 & -y_2y'_2 \\ x_3 & y_3 & 1 & 0 & 0 & 0 & -x_3x'_3 & -y_3x'_3 \\ 0 & 0 & 0 & x_3 & y_3 & 1 & -x_3y'_3 & -y_3y'_3 \\ x_4 & y_4 & 1 & 0 & 0 & 0 & -x_4x'_4 & -y_4x'_4 \\ 0 & 0 & 0 & x_4 & y_4 & 1 & -x_4y'_4 & -y_4y'_4 \end{bmatrix} \begin{bmatrix} a_1 \\ a_2 \\ a_3 \\ a_4 \\ a_5 \\ a_6 \\ a_7 \\ a_8 \end{bmatrix} = \begin{bmatrix} x'_1 \\ y'_1 \\ x'_2 \\ y'_2 \\ x'_3 \\ y'_3 \\ x'_4 \\ y'_4 \end{bmatrix};$$

let $$A = \begin{bmatrix} x_1 & y_1 & 1 & 0 & 0 & 0 & -x_1 x'_1 & -y_1 x'_1 \\ 0 & 0 & 0 & x_1 & y_1 & 1 & -x_1 y'_1 & -y_1 y'_1 \\ x_2 & y_2 & 1 & 0 & 0 & 0 & -x_2 x'_2 & -y_2 x'_2 \\ 0 & 0 & 0 & x_2 & y_2 & 1 & -x_2 y'_2 & -y_2 y'_2 \\ x_3 & y_3 & 1 & 0 & 0 & 0 & -x_3 x'_3 & -y_3 x'_3 \\ 0 & 0 & 0 & x_3 & y_3 & 1 & -x_3 y'_3 & -y_3 y'_3 \\ x_4 & y_4 & 1 & 0 & 0 & 0 & -x_4 x'_4 & -y_4 x'_4 \\ 0 & 0 & 0 & x_4 & y_4 & 1 & -x_4 y'_4 & -y_4 y'_4 \end{bmatrix}$$

$$X = \begin{bmatrix} a_1 \\ a_2 \\ a_3 \\ a_4 \\ a_5 \\ a_6 \\ a_7 \\ a_8 \end{bmatrix};$$

$$b = \begin{bmatrix} x'_1 \\ y'_1 \\ x'_2 \\ y'_2 \\ x'_3 \\ y'_3 \\ x'_4 \\ y'_4 \end{bmatrix};$$

the above formula is as follows:

$AX=b$ a nonhomogeneous equation is solved to obtain a solution:

$X=A^{-1}b$;

the corrected target paper area is obtained and then stored, and the image of the corrected target paper area is applied at the time of subsequent ballistic point detection.

The invention claimed is:

1. An analysis method for automatically analyzing a shooting accuracy of an electronic spotting scope, comprising:
   obtaining, using the electronic spotting scope, an optical image containing a target paper, wherein the target paper contains one or more points of impact;
   converting the optical image into an electronic image;
   extracting a target paper area from the electronic image;
   subtracting an electronic reference target paper from the target paper area to detect one or more points of impact;
   calculating a center point of each of the one or more points of impact; and
   determining the shooting accuracy according to a deviation between the center point of each of the one or more points of impact and a center point of the target paper area,
   wherein the subtracting step comprises:
      subtracting the electronic reference target paper from the target paper area to obtain a pixel difference image that indicates a difference at a pixel-level between the target paper area and the electronic reference target paper, wherein the electronic reference target paper is an electronic image of the target paper without a most recent point of impact;
      subjecting the pixel difference image to contour tracing to obtain a contour of the most recent point of impact; and
      calculating a center of the contour of the most recent point of impact to obtain a center point of the most recent point of impact.

2. The analysis method according to claim 1, further comprising correcting an outer contour of the target paper area to a circular shape using perspective correction after the extracting step and before the subtracting step.

3. The analysis method according to claim 2, wherein the perspective correction comprises:
   obtaining an edge of the target paper area by using a Canny operator;
   performing maximum elliptical contour fitting on the edge by using Hough transform to obtain a maximum elliptical equation;
   performing straight line fitting of cross lines on the edge by using the Hough transform to obtain points of intersection with an uppermost point, a lowermost point, a rightmost point and a leftmost point of the maximum elliptical contour;
   combining the uppermost point, the lowermost point, the rightmost point, and the leftmost point of the maximum elliptical contour with four points at the same positions in a perspective transformation template to obtain a perspective transformation matrix; and
   performing perspective transformation on the target paper area by using the perspective transformation matrix.

4. The analysis method according to claim 1, wherein the extracting step comprises:
   filtering the electronic image to eliminate grid interference on the target paper;
   segmenting the filtered electronic image into a background and a foreground by using an adaptive Otsu threshold segmentation method according to a gray property of the electronic image; and
   determining a minimum contour using a vector tracing method and a geometric feature of a Freeman link code according to the image segmented into the foreground and background to obtain the target paper area.

5. The analysis method according to claim 1, wherein the electronic reference target paper is an electronic image of a blank target paper or a target paper area that is previously extracted.

6. The analysis method according to claim 1, wherein the deviation comprises a longitudinal deviation and a lateral deviation.

7. The analysis method according to claim 1, wherein the electronic spotting scope comprises an exterior structure, an internal portion of the exterior structure defines an accommodating space, and the accommodating space houses a field of view unit, an electro-optical conversion device, a CPU processing unit, a display unit, a power supply, and a wireless transmission unit.

8. The analysis method according to claim 7, wherein the electronic spotting scope has an accuracy analysis module, wherein the accuracy analysis module is configured to analyze a shooting accuracy by adopting the analysis method.

* * * * *